United States Patent
Vichniakov et al.

(10) Patent No.: US 11,806,950 B2
(45) Date of Patent: Nov. 7, 2023

(54) MOLD ASSEMBLY FOR MANUFACTURING A COMPOSITE PART WITH A STIFFENER, METHOD OF MANUFACTURING A COMPOSITE PART AND COMPOSITE PART WITH A STIFFENER

(71) Applicant: Airbus Operations GmbH, Hamburg (DE)

(72) Inventors: Alexei Vichniakov, Hamburg (DE); Remo Hinz, Hamburg (DE); Jörg Schwickert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/893,300

(22) Filed: Aug. 23, 2022

(65) Prior Publication Data
US 2023/0068241 A1    Mar. 2, 2023

(30) Foreign Application Priority Data

Aug. 25, 2021   (EP) .................................. 21193030

(51) Int. Cl.
*B29C 70/46* (2006.01)
*B29C 70/68* (2006.01)
*B29C 70/54* (2006.01)

(52) U.S. Cl.
CPC ............ *B29C 70/46* (2013.01); *B29C 70/541* (2013.01); *B29C 70/68* (2013.01); *B29C 70/681* (2013.01)

(58) Field of Classification Search
CPC ....... B29C 70/46; B29C 70/68; B29C 70/681; B29C 70/541
See application file for complete search history.

(56) References Cited

U.S. PATENT DOCUMENTS

| | | | | |
|---|---|---|---|---|
| 4,946,526 A | * | 8/1990 | Petty-Galis | B29C 70/46 156/196 |
| 2009/0297358 A1 | * | 12/2009 | Anderson | B29C 70/342 416/241 A |
| 2013/0049258 A1 | * | 2/2013 | Rotter | B29C 70/462 264/255 |
| 2013/0180642 A1 | | 7/2013 | Blot et al. | |
| 2015/0144736 A1 | * | 5/2015 | Joern | B29C 70/443 244/119 |
| 2020/0398503 A1 | * | 12/2020 | Kendall | B29C 70/462 |

OTHER PUBLICATIONS

European Search Report; priority document.

* cited by examiner

*Primary Examiner* — Jerzi H Moreno Hernandez
(74) *Attorney, Agent, or Firm* — Greer, Burns & Crain, Ltd.

(57) ABSTRACT

A mold assembly for manufacturing a composite part with a stiffener, the mold assembly includes a bottom mold configured to form a first surface of the composite part, wherein the bottom mold has at least one elongated recess configured to form a stiffener in the composite part; a feeder unit having a shape corresponding to the at least one elongated recess, wherein the feeder unit is configured to fit at least partially into the at least one elongated recess; and a top mold configured to form a second surface of the composite part opposite to the first surface. Also a method of manufacturing a composite part using such a mold assembly, which includes draping a flat laminate over the bottom mold and pushing portions of the laminate into the at least one elongated recess.

8 Claims, 9 Drawing Sheets

MOLD ASSEMBLY FOR MANUFACTURING A COMPOSITE PART WITH A STIFFENER, METHOD OF MANUFACTURING A COMPOSITE PART AND COMPOSITE PART WITH A STIFFENER

CROSS-REFERENCES TO RELATED APPLICATIONS

This application claims the benefit of the European patent application No. 21193030.0 filed on Aug. 25, 2021, the entire disclosures of which are incorporated herein by way of reference.

FIELD OF THE INVENTION

The invention relates to a mold assembly for manufacturing a composite part with a stiffener, a method of manufacturing such composite part and the composite part including the stiffener. Particularly, the invention relates to a mold assembly for manufacturing a composite part including an integrated stiffener from a single flat and continuous sheet of laminate, and further relates to a method of manufacturing such composite part as well as the composite part including the stiffener made from the single continuous sheet of laminate.

BACKGROUND OF THE INVENTION

Composite materials, such as fiber reinforced plastics, are widely used in industrial applications as well as vehicle manufacturing. Particularly, the manufacturing of large vehicles, such as aircraft, trains, ships, buses or the like, has changed from using metal sheet materials to fiber reinforced (composite) plastic materials. The parts of the vehicles replaced by a composite material allows the production of lightweight vehicles. Thus, a plurality of vehicle components including the primary structure of the vehicle is now fabricated from composite materials, which, however, led to further obstacles.

For instance, primary structure parts of the vehicle require stiffening elements, such as frames, stringers, ribs or other stiffeners supplementing stability to an adjacent vehicle part, such as a flat part, e.g., the outer skin, a floor, a wall, etc. The stiffening elements are mounted to the part to be stiffened usually in the same manufacturing process as with metal materials, such as riveting, welding or using an adhesive.

SUMMARY OF THE INVENTION

It is therefore an object of the invention to provide a mold assembly, method of manufacturing a composite part and a composite part allowing production of the composite part in a time efficient and cost-effective manner.

According to a first exemplary aspect for understanding the present disclosure, a mold assembly for manufacturing a composite part with a stiffener comprises a bottom mold configured to form a first surface of the composite part, wherein the bottom mold has at least one elongated recess configured to form a stiffener in the composite part. The bottom mold, such as a first tool or die for forming the composite part, includes mold portions in a form of at least one elongated recess. Such mold portions together with the remainder of the bottom mold configured to form the first surface of the composite part allows manufacturing of the composite part with at least one integrated stiffener. Each of the at least one elongated recess allows forming a respective integrated stiffener.

Furthermore, the mold assembly comprises a feeder unit having a shape corresponding to the at least one elongated recess, wherein the feeder unit is configured to fit at least partially into the at least one elongated recess. In other words, the feeder unit has a shape corresponding to the longitudinal shape of the elongated recess and further has a section formed to fit inside of the elongated recess. Such feeder unit allows forming the composite part including an integrated stiffener by, for example, feeding a material for the composite part into the elongated recess.

The mold assembly further comprises a top mold configured to form a second surface of the composite part opposite to the first surface. Thus, the bottom mold and top mold can be laid on top of each other, and the composite part can be formed in a space between bottom and top mold. The top mold preferably has a shape corresponding to that of the bottom mold, so that both molds are equidistant from one another and the space between both molds allows forming a composite part in form of a sheet, wherein at least one stiffener is integrally formed with the sheet in the at least one elongated recess.

It is to be understood that the top mold and/or the bottom mold can have at least one section that deviates from an equidistant arrangement with respect to the other mold, so that the composite part can be formed in any desired shape. For instance, the composite part may be manufactured having at least one opening (formed by a corresponding protrusion disposed at the bottom mold and/or top mold) and/or having a varying thickness (formed by at least one recess and/or at least one embossment at the bottom mold and/or top mold).

In an implementation variant, the bottom mold and/or the top mold can include at least one molding surface that is curved in at least one direction. In other words, while the bottom mold and/or top mold may be flat and planar to form a flat composite part, at least one portion of the bottom mold and/or top mold may be curved. This curved portion may have a curvature in one or more directions. A curvature in one direction means that the at least one portion of the bottom and/or top mold bends around one axis, such as a portion of a cylinder surface or an elliptic cylinder surface. A curvature in, for example, two directions means that the at least one portion of the bottom and/or top mold bends around two axes or around one center point. Thus, the at least one portion of the bottom and/or top mold forms the surface of, for example, a sphere or a hyperboloid. It is to be understood that the curvature of the bottom mold and/or top mold is not restricted to these examples, but may have any desired curved form required for the particular composite part.

In another implementation variant, a depth of the at least one elongated recess can increase with increasing distance from a center of curvature of the at least one curved surface. For example, if the curved form is a portion of a cylinder, the distance of an arbitrary point of the elongated recess from a center of curvature (here the axis of rotation of the cylinder) is always the same, since the elongated recess is arranged on the cylinder. In case of a portion of an elliptic cylinder and an elongated recess running in a plane perpendicular to the axis of symmetry of the elliptic cylinder, any arbitrary point of the elongated recess can have a unique distance from the center of curvature (the distance equals the length of the semi-minor axis, the semi-major axis or any value therebetween with respect to a base ellipse of the elliptic cylinder).

With increasing distance from the center of curvature, the depth of the elongated recess can increase, too. This particularly allows forming a stiffener in the composite part of increasing height, wherein the highest part of the stiffener is at a boundary of the composite part, where the highest shearing force perpendicular to the composite part is to be expected. In the particular case of an (elliptic) cylinder the height of the stiffener may alternatively be chosen to be the same.

Likewise, in case the mold(s) form a portion of a sphere and the elongated recess runs from a top center point of the sphere portion to a point at a rim thereof, any arbitrary point of the elongated recess can have a unique distance from the center of curvature, which is an axis of rotation of the sphere portion.

In yet another implementation variant, the feeder unit can comprise a fixture and an insert placed in the fixture, and wherein the insert is configured to fit at least partially into the at least one elongated recess. The fixture of the feeder unit can be any clamping element, wherein the insert can be placed and held. The feeder unit can move the insert into the at least one elongated recess. For instance, the insert may be left in the elongated recess when the feeder unit is removed. Thus, the fixture may optionally be configured to release the insert, either actively (via an actuated clamp or the like) or indirectly by designing the fixture to have a smaller frictional influence on the insert than the insert in the elongated recess or any other element placed in the elongated recess. The latter may easily be achieved by providing a very small clamping area in the fixture holding the insert and/or a smooth surface of the fixture, while any contacting area in the elongated recess or any other element placed therein is larger than the clamping area of the fixture.

In a further implementation variant, the mold assembly can further comprise a reinforcing device configured to be inserted into the at least one elongated recess, wherein the reinforcing device includes an elongated slit. The reinforcing device may have a U-shape and is placed in the elongated recess. The allocated slit of the reinforcing device forms an elongated recess on its own, but with smaller dimensions than the elongated recess of the bottom mold. The reinforcing device may be integrated into the composite part, so that the reinforcing device reinforces the stiffener integrated into the composite part.

In an implementation variant, the reinforcing device can comprise a flange extending over a portion of the bottom mold adjacent to the elongated recess. The flange can, for example, extend from a free end of the U-shaped reinforcing device. This allows inserting the reinforcing device into the elongated recess of the bottom mold until the flange contacts and lies on the bottom mold. This facilitates integration of the reinforcing device into the composite part over a greater area of the composite part.

In another implementation variant, the at least one elongated recess can have a cross-sectional shape in form of a rectangle. The cross-sectional shape defines the shape of the stiffener. Since most of the stiffeners of such composite parts have a rectangular cross-section, such rectangular elongated recess may be a standard form. Alternatively, the at least one elongated recess can have a cross-sectional shape including a round portion. For example, a cross-sectional shape of the at least one elongated recess may have a substantially U-shaped form, may have the form of a portion of a circle or ellipse, which is open at the surface of the bottom mold forming the first surface of the composite part.

In a further implementation variant, the top mold may also be provided with at least one elongated recess. The details and variants of the at least one elongated recess described with respect to the bottom mold also apply to the at least one elongated recess of the top mold. This allows manufacturing a composite part having at least one stiffener on the second surface, i.e., opposite to the first surface of the composite part.

In case each of the bottom mold and the top mold have at least one elongated recess, the elongated recesses may be arranged at the same position of the composite part (so that the stiffeners on both surfaces of the composite part are arranged in a common plane) or may be arranged at different positions (so that the stiffeners on both surfaces of the composite part are arranged in different planes).

According to a second exemplary aspect for understanding the present disclosure, a method of manufacturing a composite part including a stiffener comprises providing a bottom mold having at least one elongated recess, draping a flat laminate onto the bottom mold, and driving a feeder unit onto the laminate. When driving the feeder unit onto the laminate, the feeder unit pushes a portion of the laminate into the at least one elongated recess. In other words, the flat laminate is arranged in a manner following the surface of the bottom mold including the surfaces inside of the at least one elongated recess.

The method further comprises pressing a top mold onto the laminate, and hardening the laminate. The hardening takes place while the bottom mold forms a first surface of the composite part, the at least one elongated recess forms a stiffener in the composite part, and the top mold forms a second surface of the composite part opposite to the first surface.

Hardening the laminate may mean actual hardening of a resin matrix included or supplied to the laminate. For instance, the resin matrix may be hardened or solidified (cured) under heat and pressure to consolidate with any fibers of the laminate. Only as an example, the laminate may comprise unidirectional fibers or a fabric made, for example, from carbon, glass or a mixture of carbon and glass fibers. The matrix can be any thermoplastic material, such as PPS (poly-phenylene sulfide), PEI (polyetherimide), PAEK (Polyaryletherketone), e.g., PEKK (Polyetherketoneketone), PEEK (Polyetheretherketone), PEI (Polyetherimide), PBI (Polybenzimidazole) or PA (Polyamide), which have high melting temperatures (usually between 250° C. and 400° C.) and require a high pressure on the full part during forming and consolidation (pressures of at least 8 bars), or can be a thermoset matrix material which can solidify under pressure and heat. The laminate may be provided as a pre-impregnated fiber or foil. The matrix may also be provided as a powder.

On the other hand, hardening may also refer to providing the laminate as a pre-consolidated thermoplastic material, which is heated in the bottom mold, so that it melts or weakens, and the feeder unit can then push the portion of the laminate into the at least one elongated recess and lay the remainder of the laminate onto the bottom mold.

In any case, a composite part including at least one stiffener can be manufactured, wherein the stiffener is fully integrated into the composite part. The composite part including a stiffener can be produced faster, since any additional process step of adhering or welding the stiffener to the remainder of the composite part can be dispensed with. Since the previously flat laminate runs continuously through any flat or curved part of the bottom mold and top mold and also in and out of the at least one elongated recess, the material of the composite part is not interrupted at the stiffener, but integrates the stiffener fully into the composite part. Due to the continuous laminate, the composite part is also stronger and more robust, since the conventional adhering or welding could lead to failure of the stiffener in the composite part. Moreover, the size of the stiffener may be reduced, since there is no requirement for sufficiently large adhering or welding interface surfaces.

In an implementation variant, the flat laminate is sized larger than the part of the bottom mold forming the first surface of the composite part, so that the flat laminate provides sufficient material to be pushed into the at least one elongated recess. For example, in case of a cylindrical bottom mold, the flat laminate may have a length in the direction parallel to the center axis of the cylinder of the height of the cylinder, plus two times the depth of the elongated recess, and optionally plus the width of the elongated recess. Thus, the flat laminate, once pushed into the elongated recess, will ends with the cylinder in its height direction.

In case of a bottom mold having a curvature according to an elliptic cylinder or a curvature in two directions, where the depth of the at least one elongated recess varies, the flat laminate can have a round shape which is larger in diameter than the bottom mold to compensate for the material to be pushed into the at least one elongated recess.

In an implementation variant, the driving of the feeder unit can comprise pushing an insert mounted to a fixture of the feeder unit at least partially together with the portion of the laminate into the at least one elongated recess, and releasing the insert from the fixture. The insert can provide additional material for the stiffener, so that the stiffener will have an increased rigidity. In addition, since the flat laminate has to be bent when pushed into the elongated recess, this pushing may be facilitated by bending the flat laminate around the insert, so that buckles or a sharp bend can be avoided. Moreover, the insert facilitates pushing the flat laminate into the elongated recess and avoids that the flat laminate is pulled out of the elongated recess when the feeder unit is removed from the elongated recess due to a pressing force against the inside walls of the recess. Particularly, the insert helps locking the portion of the laminate in the elongated recess by press fitting the laminate into the elongated recess.

Releasing the insert from the fixture can comprise actuating a clamp to open and release the insert and/or a rod pushing the insert out of the fixture. Alternatively or additionally, the fixture can be dimensioned so that the insert is form-fitted into the fixture. When the feeder unit is removed from the elongated recess, the insert will be held inside of the flat laminate pushed into the elongated recess and can move out of the form fit of the fixture. In this case, the fixture may be designed to hold the insert via frictional force, which are smaller than the frictional force applied by the laminate onto the insert, once the laminate and the insert are pushed into the elongated recess.

Furthermore, driving the feeder unit can further comprise removing the feeder unit from the laminate and the bottom mold. Thus, the insert is left in the laminate. This allows forming the second surface of the composite part without the feeder unit being in the way.

In another implementation variant, the driving of the feeder unit can comprise driving a blade portion of the feeder unit together with the portion of the laminate into the at least one elongated recess, and removing the feeder unit from the laminate and the bottom mold before pressing the top mold onto the laminate. The blade portion of the feeder unit may be configured as a small and thin portion of the feeder unit capable of pushing the portion of the laminate into the elongated recess. The blade portion may have a round edge, in order to not damage the laminate. Such blade solution may be employed if the elongated recess, and hence the to be formed stiffener, are rather small and an additional insert would not fit. The blade portion surfaces may be treated in such a manner that they glide easily over the laminate.

In a further implementation variant, the method further comprises inserting a reinforcing device into the at least one elongated recess, wherein the reinforcing device includes an elongated slit. The reinforcing device may have an outer form corresponding to the inner form of the elongated recess, so that the reinforcing device snugly fits into the elongated recess. The elongated slit of the reinforcing device may provide the same functionality as the elongated recess of the bottom mold without such reinforcing device, particularly the reception of the portion of the laminate. The reinforcing device performs an outer circumference of the stiffener once the composite part has been completely manufactured.

Thus, driving the feeder unit can comprise pushing the portion of the laminate into the elongated slit of the reinforcing device. The disclosed functionality of the feeder unit with respect to pushing the portion of the laminate into the elongated recess of the bottom mold likewise applies to pushing the laminate into the elongated slit of the reinforcing device and is not repeated here.

In yet a further implementation variant, the method can further comprise draping a laminate patch onto the laminate, at least at portions of the laminate corresponding to the elongated recess. In other words, the portions of the laminate pushed into the elongated recess form an opening, gap or at least an indent on the side of the laminate opposite to the bottom mold. The patch can be used to close this opening, gap or indent, in order to have a continuous and flush surface of the composite part opposite to the bottom mold.

According to a third exemplary aspect for understanding the present disclosure, a composite part comprises a body, and at least one stiffener extending from a first side of the body, wherein the body and the at least one stiffener consist of a single continuous sheet of laminate. Thus, instead of a stiffener adhered or welded to a sheet-like composite part the at least one stiffener is an integral portion of the composite part.

In an implementation variant, the composite part can further comprise an insert disposed in the stiffener and partially surrounded by the laminate. For instance, the insert may be pushed inside of the laminate forming the stiffener before hardening. In addition, a side of the insert corresponding to a second side of the body opposite to the first side of the body is not covered by the laminate. In other words, the end of the insert coupled to the feeder unit may stick out of the laminate or may be visible and flush with the adjacent laminate.

According to a fourth exemplary aspect for understanding the present disclosure, an aircraft can comprise at least one composite part according to the third exemplary aspect. Specifically, the composite part may form a portion of the aircraft having a complex structure, particularly including at least one stiffener.

The composite part may be or form a portion of a pressure bulkhead in the aircraft. As another example, the composite part may be of form a portion of a single or double curved shell of the fuselage, a wing cover, a shell of a pylon, a shell of a movable aerodynamic member (such as a flap or slat), a leading edge or trailing edge of a wing, a door, a doorframe or any other structure including stiffeners, such as ribs, frames, spars or stringers.

It is to be understood that the composite part can be employed with any type of vehicle, besides aircraft, which include complex structural parts, such as trains, ships, buses or the like.

The present disclosure is not restricted to the aspects and variants in the described form and order. Specifically, the description of aspects and variants is not to be understood as a specific limiting grouping of features. It is to be understood that the present disclosure also covers combinations of the aspects and variants not explicitly described. Thus, each variant or optional feature can be combined with any other aspect, variant, optional feature or even combinations thereof.

BRIEF DESCRIPTION OF THE DRAWINGS

Preferred embodiments of the invention are now explained in greater detail with reference to the enclosed schematic drawings, in which FIG. 1 schematically illustrates a perspective view of a mold assembly and certain details thereof.

DETAILED DESCRIPTION OF THE PREFERRED EMBODIMENTS

Figure 1:
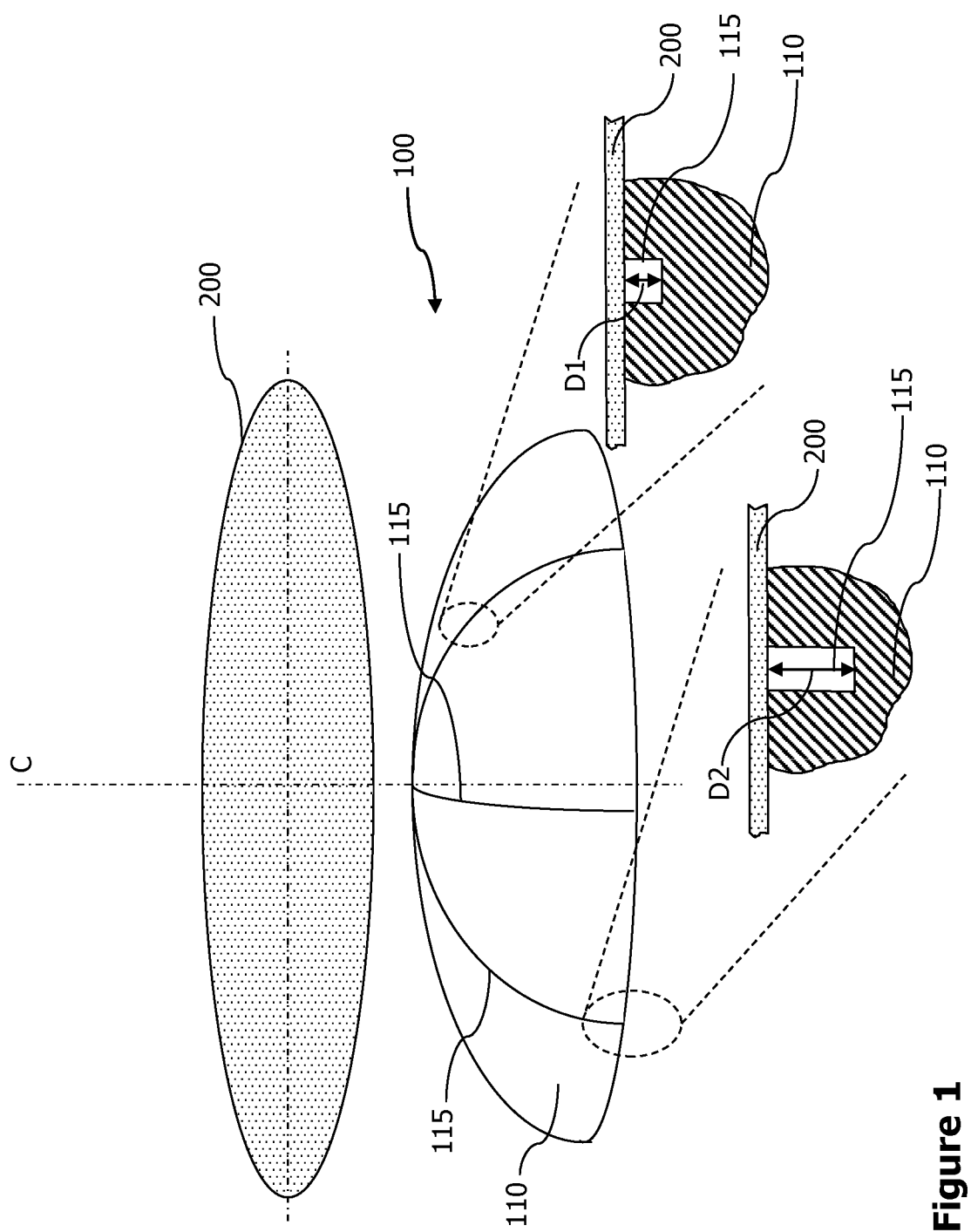
Figure 8:
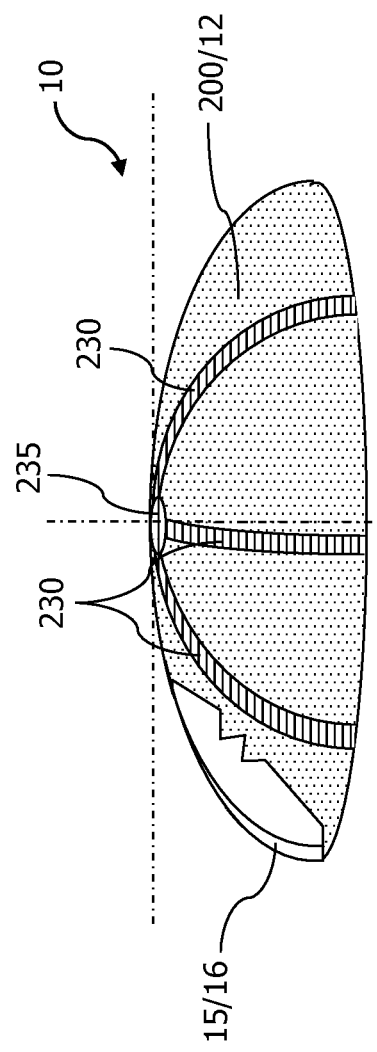
FIG. 8 schematically illustrates a perspective view of a composite structure.

FIG. 1 schematically illustrates a perspective view of a part of a mold assembly 100. The mold assembly 100 comprises a bottom mold 110 that is configured to form a first surface of a composite part 10 (FIG. 8). The composite part 10 can be manufactured, which will be outlined in more detail below, by draping a flat laminate 200 onto the bottom mold 110 the laminate may be any thermoplastic or thermoset fiber reinforced sheet.

The illustrated bottom mold 110 has a molding surface (upper and visible surface in FIG. 1) that is curved in at least one direction, particularly in two directions. One curvature is around a center axis C, i.e., the bottom mold 110 is of a circular shape. In addition, from a center of the bottom mold (where center axis C intersects with bottom mold) the bottom mold 110 bends downwards, i.e., is curved in a second direction. The second curvature has to be contemplated in each cross-section running through center axis C. Such cross-section of the bottom mold 110 forms a portion of a circle or ellipse, which has a center at a position on center axis C below the top of bottom mold 110.

The flat laminate 200 is larger than the bottom mold 110, i.e., has a larger diameter (in horizontal direction in FIG. 1), in order to be draped over the entire bottom mold 110. However, due to the curvature of the bottom mold 110, the laminate will not fit at an outer rim of the bottom mold 110. This effect is used to form integrated stiffeners 15, 16 (FIGS. 5 to 7) into the composite part 10. To do so, the bottom mold 110 comprises at least one elongated recess 115 configured to form such stiffener 15, 16.

As illustrated in the two details in FIG. 1 of the elongated recesses 115, a depth D1, D2 of the elongated recess 115 increases with increasing distance from the center C of curvature of the at least one curved surface. In other words, the elongated recess 115 as a smaller depth D1 at a position on the bottom mold 110 closer to the center axis C and has a larger depth D2 further away from the center axis C with a maximum at the bottom end of the bottom mold 110.

Only as an example, if the bottom mold 110 is of a circular shape around center axis C and its cross-section forms a 40° portion of a circle on each side of the center axis C, the bottom mold can have a radius of 1.4 meters at its bottom rim, while the flat laminate has a radius of 1.414 meters. If 8 stiffeners shall be formed in the composite part, each stiffener can have a maximum depth D2 of 48 mm.

Figure 2:
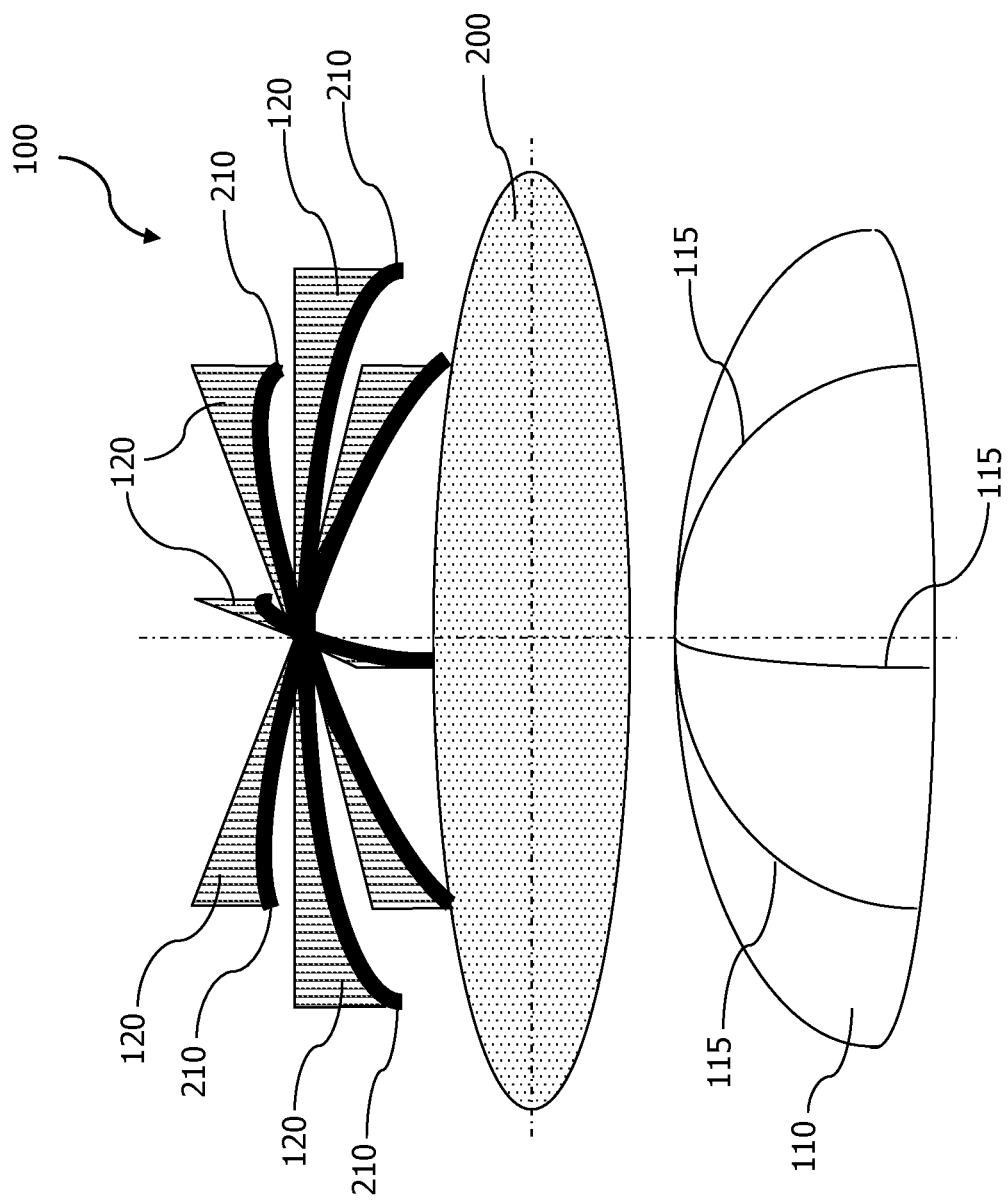
FIGS. 2 and 3 schematically illustrate perspective views of a mold assembly at subsequent process situations.
Figure 3:
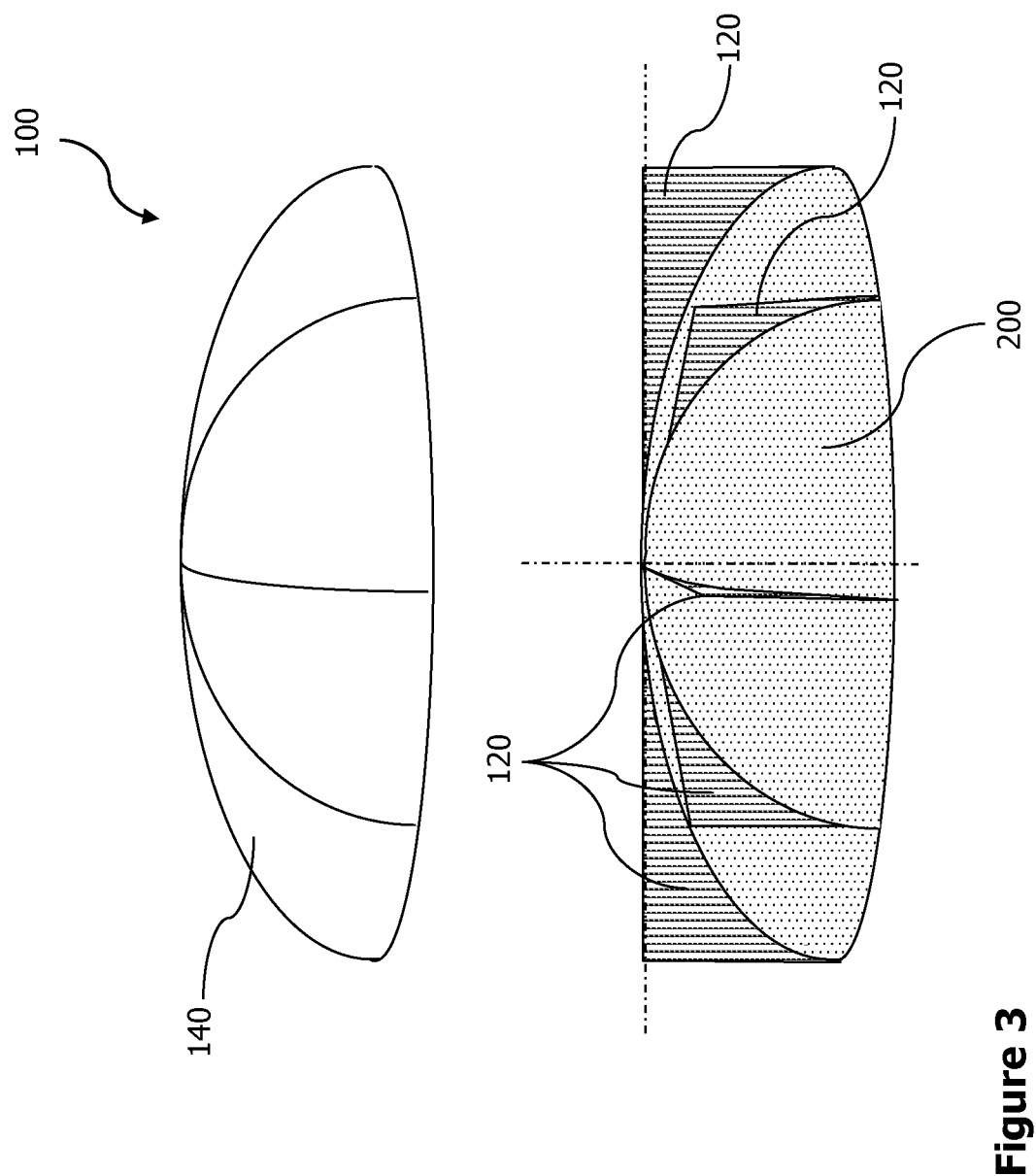

FIGS. 2 and 3 schematically illustrate perspective views of a mold assembly 100 at subsequent process situations. Specifically, in order to form the stiffeners 15, 16 in the composite part 10, the flat laminate 200 has to be put into the at least one elongated recess 115 after draping the flat laminate 200 over the bottom mold 110. This may be achieved by a feeder unit 120 of the mold assembly 100. The feeder unit 120 has a shape corresponding to the at least one elongated recess 115. In the specific illustrated case, 8 stiffeners shall be formed, so that 8 elongated recesses 115 are in the bottom mold 110. The corresponding feeder unit 120 has a star form with 8 arms. Each of the arms of the feeder unit 120 is curved at its bottom edge in correspondence to the curvature of the bottom mold 110 as well as the elongated recess 115.

The feeder unit 120 is moved onto the bottom mold 110 and further into a position where at least a part of the feeder unit 120 fits into the at least one elongated recess 115. Thereby, a portion of the laminate 200 is pushed into the at least one elongated recess 115 by the feeder unit 120, as illustrated in the lower part of FIG. 3.

Still with respect to FIG. 3, the mold assembly 100 can further comprise a top mold 140 configured to form a second surface of the composite part 10 opposite to the first surface, wherein the first surface is the one including the stiffeners 15, 16. The top mold 140 may either comprise a plurality of openings, so that the top mold 140 can be placed over the draped laminate 200, while each arm of the feeder unit 120 fits through one opening of the top mold 140. The bottom mold 110 and top mold 140 can now be used to apply a pressure to the laminate 200 for hardening. Alternatively, the feeder unit 120 is removed and the top mold 140 forms a sphere without openings covering the entire draped laminate 200.

Figure 4:
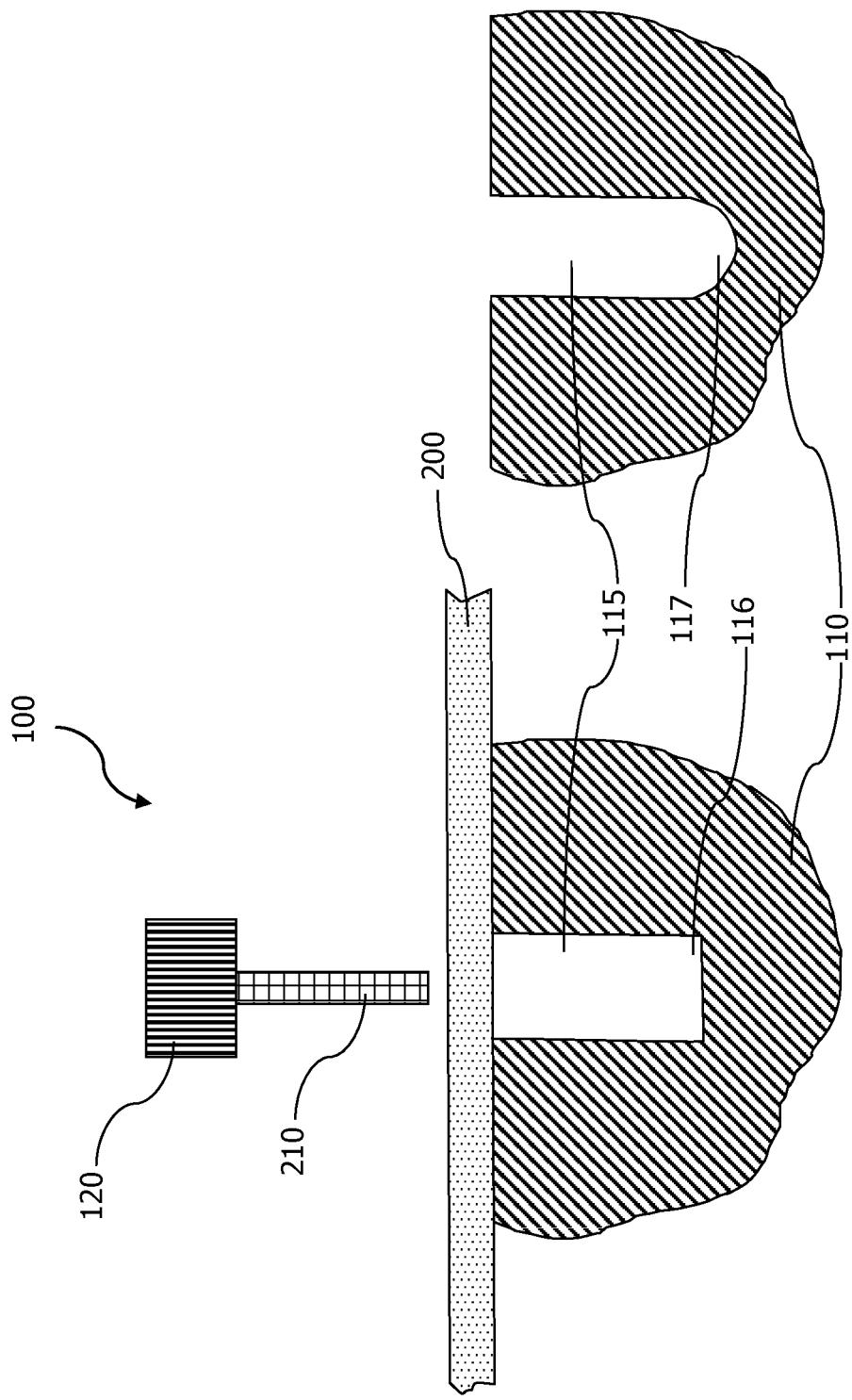
FIGS. 4 and 5 schematically illustrate cross-sections of a detail of a mold assembly at subsequent process situations.
Figure 5:
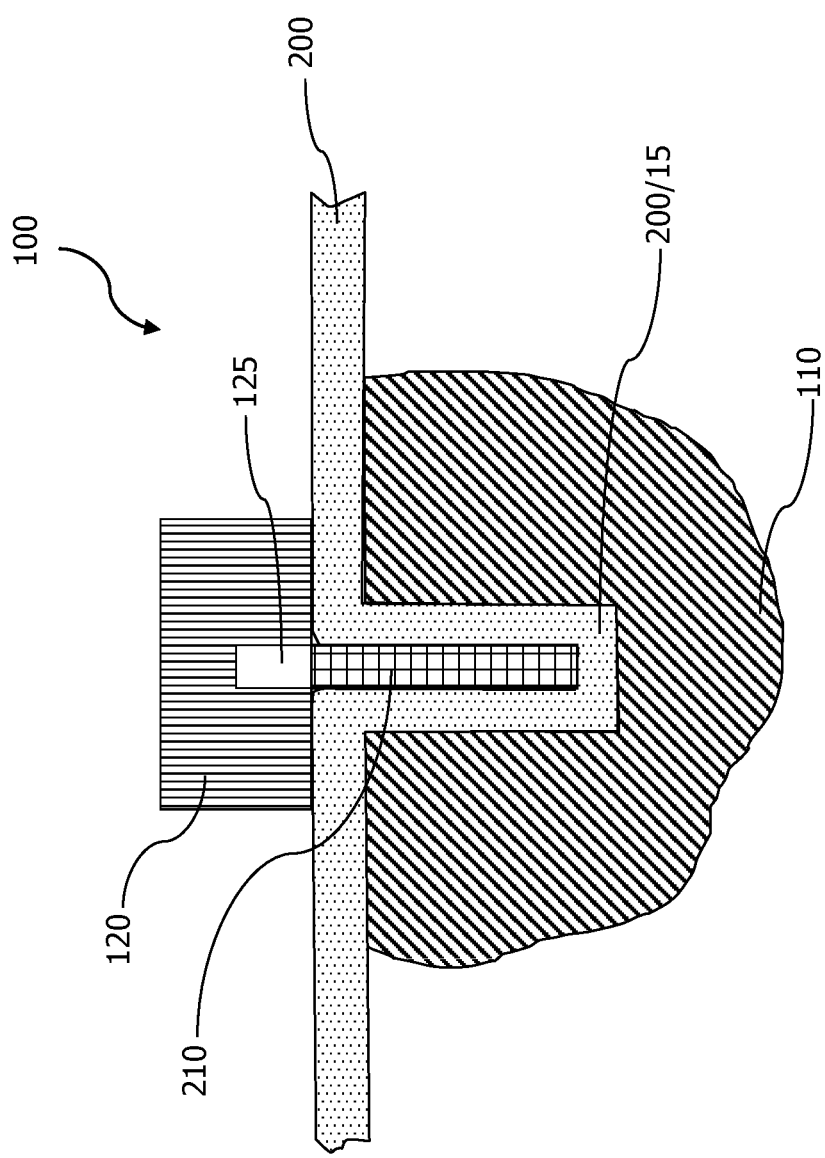
Figure 6:
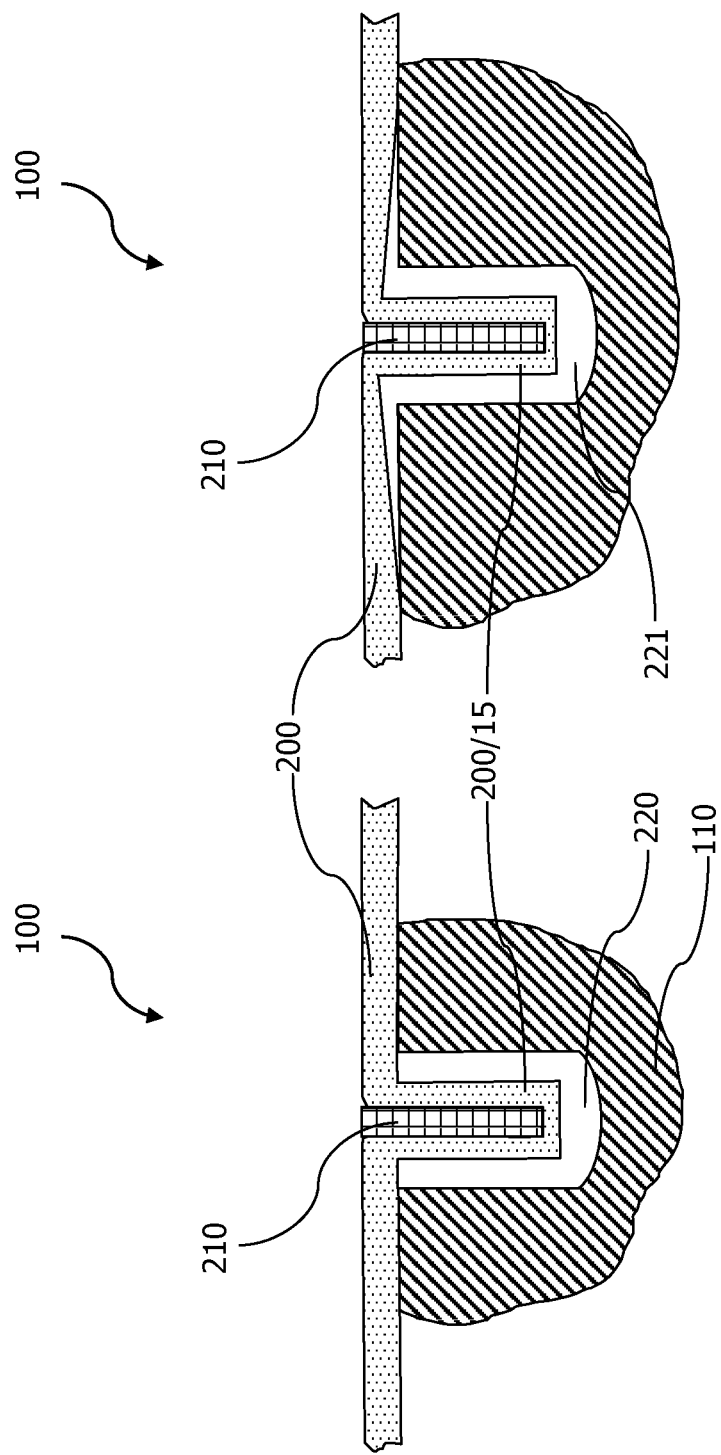
FIGS. 6 and 7 schematically illustrate cross-sections of a detail of a mold assembly in different exemplary configurations.

The pushing of the laminate 200 into the elongated recesses 115 is now explained in more detail with respect to FIGS. 4 to 7. For instance, the feeder unit 120 may comprise a fixture 125 (FIG. 5), to which an insert 210 (FIGS. 2 and 4) is mounted. When the feeder unit 120 is moved towards the bottom mold 110, the insert 210 pushes the portion of the laminate 200 into the at least one elongated recess 115, the result of which is illustrated in FIG. 5. The portion of the laminate 200 surrounds most of the circumference of the insert 210, with the exception of the upper side of the insert 210 which faces the fixture 125 of the feeder unit 120.

The insert 210 can be dimensioned to press fit the portion of the laminate 200 into the elongated recess 115, so that the recess 115 is completely filled by the laminate 200 and the insert 210, and the stiffener 15, 16 will later be free of voids.

As is illustrated in FIG. 4, the elongated recess 115 can have a cross-sectional shape corresponding to a desired outer surface of the stiffener 15, 16. Only as examples, a cross-sectional shape of a rectangle 116 and a cross-sectional shape of substantially U-form 117 is shown in FIG. 4. In other words, the bottom end 116, 117 of the elongated recess may either have sharp corners or a round shape, respectively. It is to be understood that the resulting stiffener may also have widening portions at a distal end or elsewhere, which can be formed by a corresponding recess and optionally an insert of flexible material, which pushes the laminate in the widened portion of the recess.

Furthermore, the insert 210 can be released from the fixture 125 by a mechanism pushing the insert 210 out of the fixture 125, which is illustrated in FIG. 5. Alternatively, the insert 210 may be released from the fixture 125 simply by a press fit in the recess 115, which creates a higher frictional force on the insert 210 than in the fixture 125. Also alternatively, an insert 211 (as in the right part of FIG. 7) may be pushed into the recess 115 that extends over the upper surface of the laminate 200 when draped over the bottom mold 110. This extending insert 211 facilitates pressing the laminate 200 into the recess 115 during hardening for an improved continuous form of the stiffener 15, 16.

An alternative and simpler way of pushing the laminate 200 into the recesses 115 may be achieved by a blade portion of the feeder unit 120 arranged at the bottom end of the feeder unit 120 (not explicitly illustrated in the drawings). Such blade portion functions as the insert 210, but is part of or fixed to the feeder unit 120. Thus, when removing the feeder unit 120, the blade portion is also removed from the portion of the laminate 200 in the elongated recess 115. This allows manufacturing of stiffeners 15, 16, which have a width of substantially double the thickness of the laminate 200. Using a thin blade portion (not illustrated), the laminate 200 can be pushed into the recess 115 without an insert.

The stiffener 15, 16 may further be formed using a reinforcing device 220, 221 (FIG. 6) configured to be inserted into the at least one elongated recess 115. The reinforcing device 220 can be of a U-form, the outer circumference of which coincides with the inner surface of the recess 115. Another type of reinforcing device 221 may be supplemented with at least one flange extending over a portion of the bottom mold 110 adjacent to the elongated recess 115, when the reinforcing device 221 is inserted into the recess 115. The flange may be tapered towards its outer ends. Any flange provides for a good integration into the composite parts 10.

In any case, the reinforcing device 220, 221 includes an elongated slit, which provides the same functionality as the elongated recess 115. Since the reinforcing device 220, 221 may be formed of a different material than the laminate 200, the stiffener 15, 16 can be provided with any property required for the particular composite part 10. The reinforcing device 220, 221 may also be made of the same material as the laminate 200 or may be made of a pre-consolidated or semi-cured material. This allows improving precision of the dimensions of the stiffener 15, 16.

Figure 7:
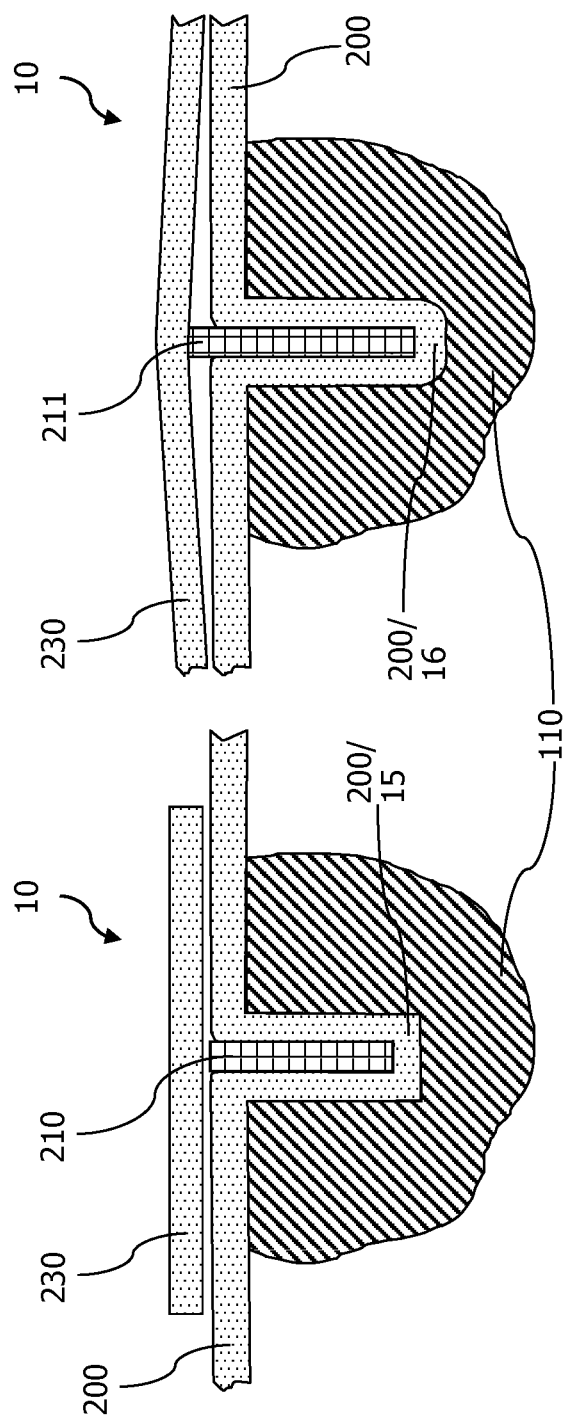

Referring to FIG. 7, at the upper part of the laminate 200 two bend portions of the laminate will contact one another or contact the insert 210, 211. Thus, the composite part 10 is not closed and could be vulnerable due to a non-continuous surface. This may be improved by draping a laminate patch 230, 235 (see also FIG. 8) onto the laminate 200 at least at portions of the laminate 200 corresponding to the elongated recess 115. Such patch 230 closes the upper side of the composite part 10 along the elongated recess 115. A top patch 235 may close any gap in the center of the composite parts 10, if the stiffeners reach to the center C.

FIG. 8 schematically illustrates a perspective view of a composite structure 10. On the left-hand side of FIG. 8 the composite structure 10 is illustrated broken up, so that the inside of the spherical composite structure 10, and particularly one of the stiffeners 15, 16, is visible. On the outside of the composite structure 10, the portions of the laminate 200, which are bend on the outside part of the stiffeners 15, 16 are covered by respective patches 230, 235. The portions 12 of the composite structure 10 between a pair of stiffeners 15, 16 have the shape corresponding to the bottom mold 110 and top mold 140. Likewise, the outer (upper) surface of the patches 230, 235 can be formed by the top mold 140.

Figure 9:
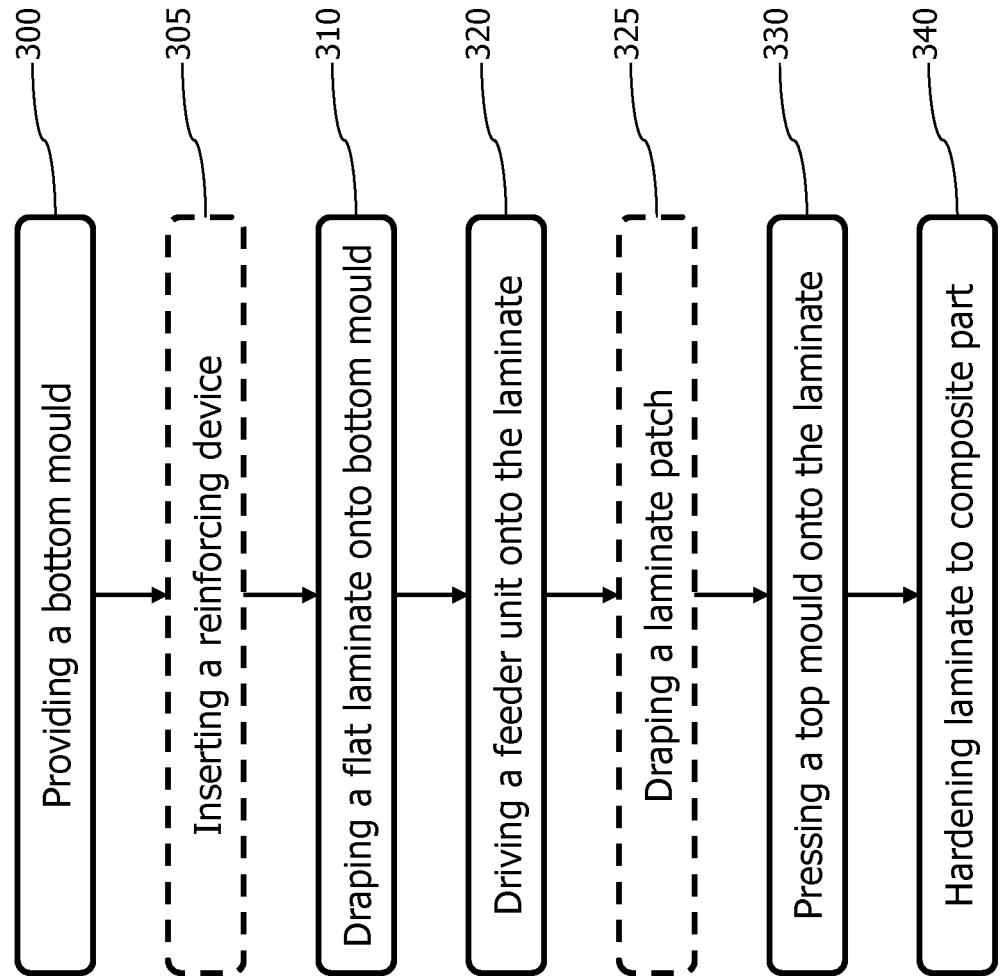
FIG. 9 illustrates an exemplary flow diagram of a method of manufacturing a composite part including a stiffener.

FIG. 9 illustrates an exemplary flow diagram of a method of manufacturing a composite part 10 including a stiffener 15, 16. The method starts in step 300 with providing a bottom mold 110 having at least one elongated recess 115. In an optional step 305 a reinforcing device 220, 221 can be inserted into at least one of the at least one elongated recess 115.

The manufacturing method continues in step 310 with draping a flat laminate 200 onto the bottom mold 110, and in step 320, with driving a feeder unit 120 onto the laminate 200. The feeder unit 120 pushes a portion of the laminate 200 into the at least one elongated recess 115 or into a slit of a reinforcing device 220, 221, if present in the elongated recess 115.

Furthermore, the laminate 200 may be supplemented with a laminate patch 230, 235 draped in step 325 onto the laminate 200 at least at portions of the laminate 200 corresponding to the elongated recess 115. Particularly, the laminate patch 230, 235 is draped onto a side of the laminate 200 facing away from the bottom mold 110.

The draped laminate 200 and optionally the laminate patch 230, 235 is then pressed in step 330 by a top mold 140 pressing the laminate 200 towards the bottom mold 110. This pressing may also act on an insert 210 inserted between the portion of the laminate 200 pushed into the elongated recess 115. This facilitates filling the recess 115 completely by the laminate 200.

Finally, the laminate 200 is hardened in step 340 to form the composite part 10. Specifically, the bottom mold 110 forms a first surface of the composite part 10, the at least one elongated recess 115 forms a corresponding stiffener 15, 16 integrated in the composite part 10, and the top mold 140 forms a second surface of the composite part 10 opposite to the first surface.

Figure 10:
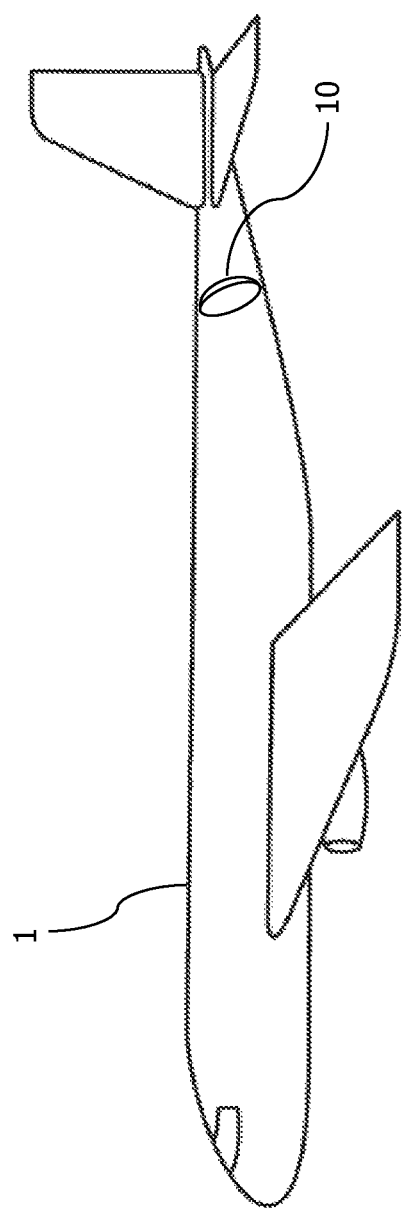
FIG. 10 schematically illustrates an aircraft.

FIG. 10 schematically illustrates an aircraft 1 comprising at least one composite part 10. Specifically, the illustrated aircraft 1 comprises a rear bulkhead 10 made from a composite material. Conventional rear bulkheads were made from several metal components mounted together. Using the method and composite part 10 of the present disclosure significantly reduces the time to manufacturing such rear bulkhead 10 and further reduces the weight of such bulkhead 10.

It is to be understood that other portions of the aircraft 1, such as doors, parts of the wing, parts of the fuselage, etc., may be formed by a composite part 10 as herein disclosed.

The above description of the drawings is to be understood as providing only an exemplary embodiment of the present invention and shall not limit the invention to this particular embodiment.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of manufacturing a composite part including a stiffener, the method comprising:
    providing a bottom mold having at least one elongated recess in a molding surface of the bottom mold;
    draping a flat laminate onto the bottom mold;
    driving a feeder unit onto the laminate, wherein the feeder unit pushes a portion of the laminate into the at least one elongated recess;
    pressing a top mold onto the laminate; and
    hardening the laminate, wherein the bottom mold forms a first surface of the composite part, the at least one elongated recess forms a stiffener in the composite part, and the top mold forms a second surface of the composite part opposite to the first surface, wherein the molding surface is curved in at least one of:
        a radial direction extending from a center of the molding surface, such that the molding surface forms a circular shape and the at least one elongated recess extends from the center of the molding surface; and
        a vertical direction, such that the molding surface bends downward.

2. The method according to claim 1, wherein driving the feeder unit comprises:
    pushing an insert mounted to a fixture of the feeder unit together with the portion of the laminate at least partially into the at least one elongated recess, and
    releasing the insert from the fixture.

3. The method according to claim 2, wherein driving the feeder unit further comprises removing the feeder unit from the laminate and the bottom mold.

4. The method according to claim 1, wherein driving the feeder unit comprises:
    driving a blade portion of the feeder unit together with the portion of the laminate into the at least one elongated recess, and
    removing the feeder unit from the laminate and the bottom mold before pressing the top mold onto the laminate.

5. The method according to claim 1, further comprising:
    inserting a reinforcing device into the at least one elongated recess, wherein the reinforcing device includes an elongated slit, and
    wherein driving the feeder unit comprises pushing the portion of the laminate into the elongated slit of the reinforcing device.

6. The method according to claim 1, further comprising:
    draping a laminate patch onto the laminate at least at portions of the laminate corresponding to the elongated recess.

7. The method according to claim 1, wherein the upper mold is curved in both the radial direction and the vertical direction and wherein side edges of the at least one elongated recess extend perpendicularly to the molding surface.

8. The method according to claim 1, wherein a depth of the at least one elongated recess increases with increasing distance from the center of the molding surface.

* * * * *